United States Patent
Pletcher et al.

(10) Patent No.: US 6,765,592 B1
(45) Date of Patent: Jul. 20, 2004

(54) UNDOCKABLE SUB-WINDOWS (75) Inventors: Richard A. Pletcher, Redmond, WA (US); Curtis D. Smith, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/302,476

(22) Filed: Apr. 30, 1999

(51) Int. Cl.[7] .................................................. G09G 5/00
(52) U.S. Cl. ........................ 345/760; 345/781; 345/804
(58) Field of Search .............................. 345/760, 764, 345/769, 772, 774–5, 778–9, 781, 783, 788, 790–7, 803–8; 707/513

(56) References Cited

U.S. PATENT DOCUMENTS

| | | | | |
|---|---|---|---|---|
| 5,469,536 A | * | 11/1995 | Blank | 345/594 |
| 5,544,300 A | * | 8/1996 | Skarbo et al. | 345/753 |
| 5,613,058 A | * | 3/1997 | Koppolu et al. | 345/744 |
| 5,821,931 A | * | 10/1998 | Berquist et al. | 345/784 |
| 5,870,091 A | * | 2/1999 | Lazarony et al. | 345/804 |
| 5,923,326 A | * | 7/1999 | Bittinger et al. | 345/805 |
| 6,240,444 B1 | * | 5/2001 | Fin et al. | 709/205 |
| 6,313,854 B1 | * | 11/2001 | Gibson | 345/746 |
| 6,401,134 B1 | * | 6/2002 | Razavi et al. | 345/808 |

\* cited by examiner

*Primary Examiner*—John Cabeca
*Assistant Examiner*—Brian Detwiler
(74) *Attorney, Agent, or Firm*—Banner & Witcoff, Ltd.

(57) ABSTRACT

A system, method, and medium are disclosed for undocking content from a window into sub-windows. The undocked sub-windows may be redocked to the parent window. The sub-windows may continue to exist after an application providing the window has been closed.

20 Claims, 8 Drawing Sheets

UNDOCKABLE SUB-WINDOWS

I. BACKGROUND OF THE INVENTION

A. Technical Field

In general, the present invention relates to interacting with documents, and more particularly to undocking sections from HTML (hypertext markup language) documents.

B. Background of the Invention

The Internet has experienced tremendous growth. Through various HTML programming techniques (including tables and frames, for example), information may be presented to end users in visually appealing forms. However, one of the difficulties with these presentation techniques is that, once the table or form is coded, the end user has little ability by which to interact with the presented information. For instance, if a user is viewing an article in a frame as displayed in a browser (for example, Internet Explorer (IE) 4.0 by the Microsoft® Corporation or Netscape Navigator (NN) 4.0 by the Netscape Corporation), the user may scroll up or down the article. However, the user cannot read the article once the browser is closed. Further, the article cannot be moved apart from the window supported by the browser. The viewing interactivity experienced by the end user remains at a low level.

The ability to undock one display window from another allows a user to separate the two windows. However, current undocking solutions fail to provide an end user with freedom to navigate beyond the displayed windows. At least one Internet video-conferencing application (i.e., NetMeeting™) provides the ability to undock viewing windows. However, these "undocked" windows, while independently positionable, remain part of the parent video-conferencing application. Closing the parent video-conferencing application also closes the undocked windows.

Further, current separable windows in browsers fail to provide any sort of docking. In the current version of browsers (IE 4.0 or NN 4.0), instead of navigating to a new window with the current instance of the browser, an end user may open a new browser window and navigate it separately from the original instance of the browser. However, the user is always aware of the two separate instances of the browser. There is no ability to dock the two windows together to provide a browser window that is unified in appearance and navigation. Also, the two windows effectively remain independent of each other. In this regard, navigation of the first window does not effect the content of the second window. Current browsers do not allow incorporated content to be undocked from a main application.

In short, while providing simple textual markups and related display characteristics, HTML is limited in that it fails to provide application designers with a complex design language for applications. The current state of browsers or the HTML language itself fails to provide the needed underlying framework for these applications. While e-mail clients and NetMeeting™ incorporate a limited ability to undock windows from each other, a developer familiar only with HTML is prevented from providing even this limited functionality to a web page or an HTML document.

II. SUMMARY OF THE INVENTION

In order to overcome the drawbacks mentioned above, the disclosed invention allows a user a greater amount of interactivity with displayed information. For example, the user may undock a desired portion from a parent window and manipulate the undocked desired portion apart from the parent window. Further, the undocked window may exist on its own after closing the parent application.

Controls, as used by the invention, may include Java-based scripts (developed by Sun Microsystems) and ActiveX® controls (developed by Microsoft® Corporation of Redmond, Wash.). ActiveX® controls are a popular and effective way of encapsulating functionality and distributing this functionality across a variety of platforms. Unlike Java applets and certain plug-ins, ActiveX® controls may be written in any number of programming languages. ActiveX® controls, based on OLE controls or OCX controls, are components (or objects) which can be inserted into a web page or other application to reuse packaged functionality that someone else programmed. For example, Microsoft's Internet Explorer 3.0 contains ActiveX® controls that allow users to enhance web pages with sophisticated formatting features and animation. ActiveX® controls are an enhancement over Java applets and certain web browser plug-ins since ActiveX® controls may also be used in applications written in any number of programming languages. Web authors may also write their own ActiveX® controls using Visual Basic 5.0 or Visual C++ and an ActiveX® control framework such as Microsoft Foundation Class Library (MFC), the ActiveX® Template Library (ATL), or the BaseClt framework. ActiveX® controls are designated within a web page by use of a standard HTML <OBJECT> tag. Typically, object tags include a set of parameters that include name value pairs, which are the persistence information of the control. The object tag includes a set of parameters that specify which control should be used and control the appearance and behavior of the control.

In one embodiment, the invention relates to a control placed on a web page that supports contained text (or images or other data) in which a displayed window containing the text may be undocked from the displayed page. The undocked window (that is, the sub-content window) may to remain open after a user closes the browser. In an alternative embodiment, the undocked window may close with the parent application. Various applications of the invention relate to how an undocked window is re-docked to the web page including the handling of updates to the information contained in the window. Also, the invention may be applied to support information being ported from one application to another.

Applied to a browser platform, portions of an HTML document may be encapsulated by a script-based control according to the invention. For instance, the script-based control may be an ActiveX® Control (by the Microsoft® Corporation) similar to an IFRAME. The control then allows the user to "undock" a selected portion from a main content window (e.g., a browser window). The selected portion would then appear in a separate window that can be positioned and viewed independent of the original content window. In the browser example, the user can then navigate the browser away from the original document without affecting the undocked subcontent window. A further implementation of the invention allows the browser application to even be closed while leaving the undocked sub-content window open.

The invention includes aspects related to user interfaces for providing the user with an environment for undocking and docking sub-content windows, data structures for supporting the claims, (relating to the data structure as including different controls), system and method claims (relating to the support of the windows and coordination of events between the different windows), and computer-readable medium claims (related to a program for creating the undockable windows and for handling the windows once created).

These and other novel advantages, details, embodiments, features and objects of the present invention will be apparent to those skilled in the art from following the detailed description of the invention, the attached claims and accompanying drawings, listed herein, which are useful in explaining the invention.

III. BRIEF DESCRIPTION OF THE DRAWINGS

In the following text and drawings, wherein similar reference numerals denote similar elements throughout the several views thereof, the present invention is explained with reference to illustrative embodiments, in which.

IV. DETAILED DESCRIPTION

The present invention is described as it would be used for Internet applications, which is one embodiment of the invention. The present invention, however, may be implemented generally within any number of computer applications including any software development tool for authoring text and computer-executable code. In the context of developing web pages, the present invention provides a tool for efficiently interacting with hypertext markup language (HTML) documents. In this context, the present invention may be authored within an authoring tool such as, for example, Visual C++, Visual InterDev and Visual J++ by Microsoft® Corporation of Redmond, Wash. The interaction with the dockable and undockable windows may occur in Internet Explorer 4.0, also by the Microsoft® Corporation.

As used herein, HTML script is intended to include the various scripting languages available for execution on browsers. The actual scripting language used when converting from the following programming environment into the HTML environment may vary based on the browsers to which the HTML code is to be eventually sent. Since the language, JavaScript is common to both Internet Explorer 4 (from Microsoft® Corporation) and Netscape Navigator 4 (from Netscape Corporation), this language may be used. Other languages (as are well known in the art) are also becoming available for use in browsers and are considered within the scope of the invention.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), hand-held devices, multiprocessor systems, microprocessor-based or programmable consumer electronics, network PCs, minicomputers, mainframe computers, and the like.

A. Order of Description

In order to comprehend more readily the embodiments of the invention contained herein, the following lists the order of the contents of the detailed description:

Terms;

General Purpose Computer;

Docking and Undocking;

Objects and Object Relationships; and

Summary.

B. Terms

The following terms are used throughout the specification to relate to various concepts.

"Undock"—generally refers to the ability to separate a portion of a window into a separate window for independent movement and interaction.

"Dock"—refers to the ability to incorporate the contents of a separate window into another window or portion of a window.

C. General Purpose Computer

Figure 1:
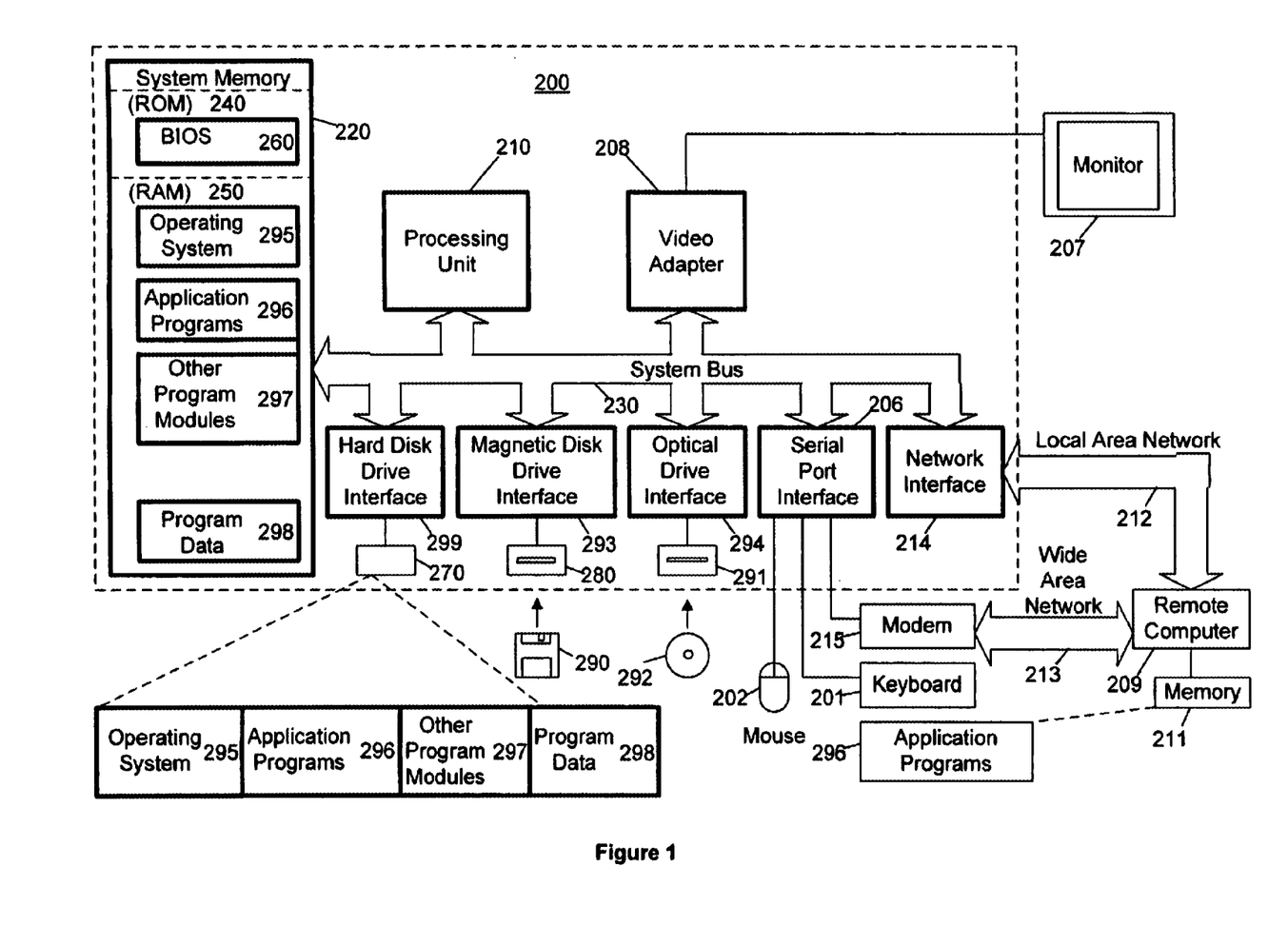
FIG. 1 shows a schematic diagram depicting a computing environment according to embodiments of the present invention.

FIG. 1 is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 299, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

D. Docking and Undocking

Figure 2:
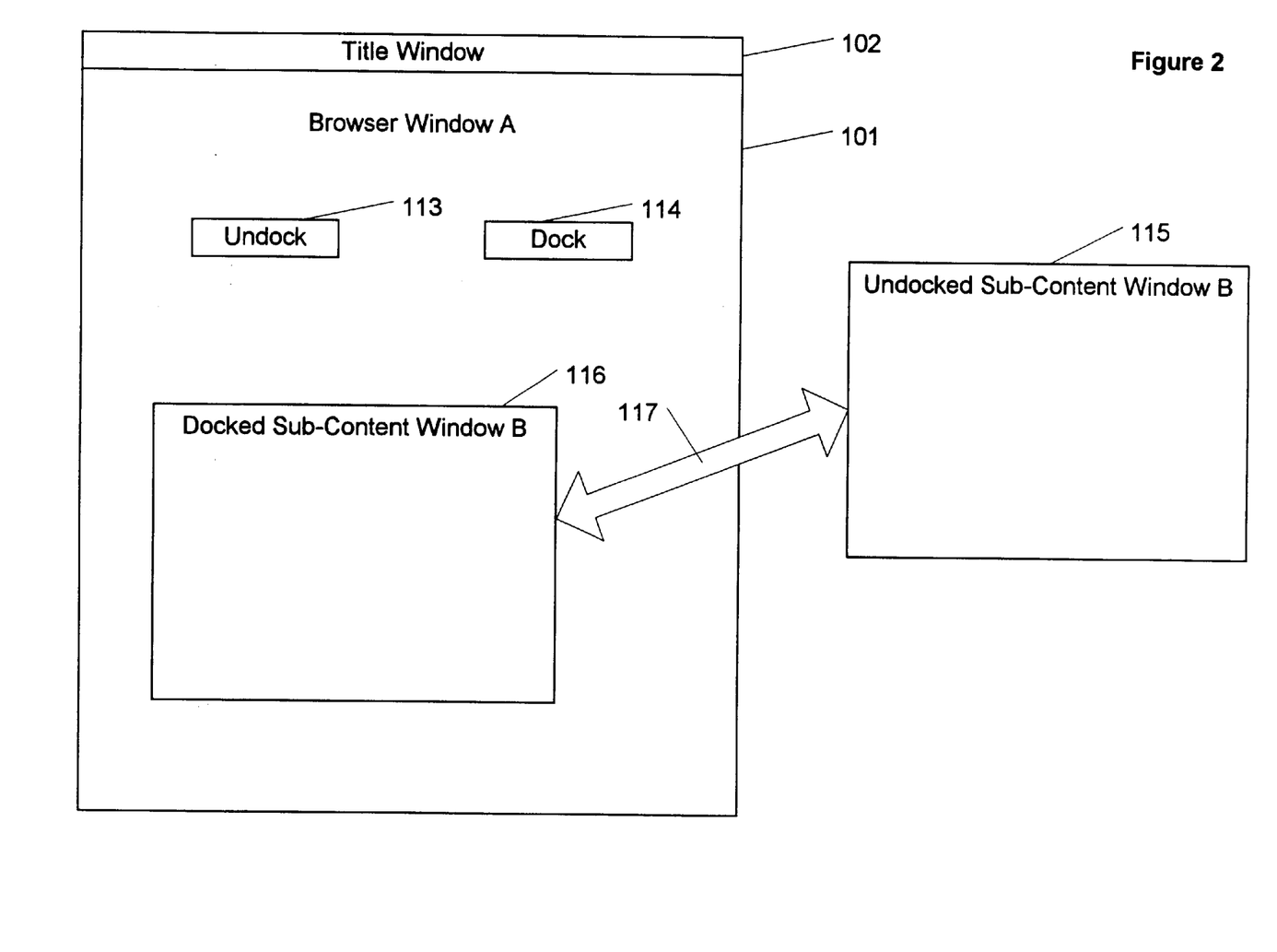
FIG. 2 shows the undocking of a window according to embodiments of the present invention.

FIG. 2 represents one embodiment of the ability to support undockable content windows on a page. FIG. 2 shows a browser window A 101 with title window 102. Browser window A 101 also includes two buttons Undock 113 and Dock 114. When coding a page to be downloaded into a browser, the programmer incorporates the content to be displayed in an undockable sub-window. In one embodiment, the programmer can wrap the content to be displayed in HTML delimiters that specify the content may be undocked. Alternatively, the programmer may include a reference to an undocking control followed by a pointer to the location of the content. Similar to an IFRAME interface, this approach allows the programmer to easily specify that the content window is an undockable content window without having to incorporate the content itself. Alternatively, buttons 113 and 114 may be replaced by a script control that monitors the user's mouse input, in which a double click on the content signifies a request to undock the content window. Further, the undock and/or dock features may be under script control monitoring the elapsed time an end user spends on a page. After a predetermined elapsed time, the specified content portion may be undocked.

On the displayed page, two buttons may be shown: an undock button 113 and a dock button 114. As their names suggest, the script underlying the buttons undocks and docks a designated docked sub-content window 116. This undocking can keep the sub-content window B 116 in place over the browser window A 101 or move it to another location (as represented by arrow 117) to suggest the undocking nature of the window as represented by undocked sub-content window B 115. How the undocked window is represented is a matter of scripting the specific commands to move a window to a new location.

Figure 3:
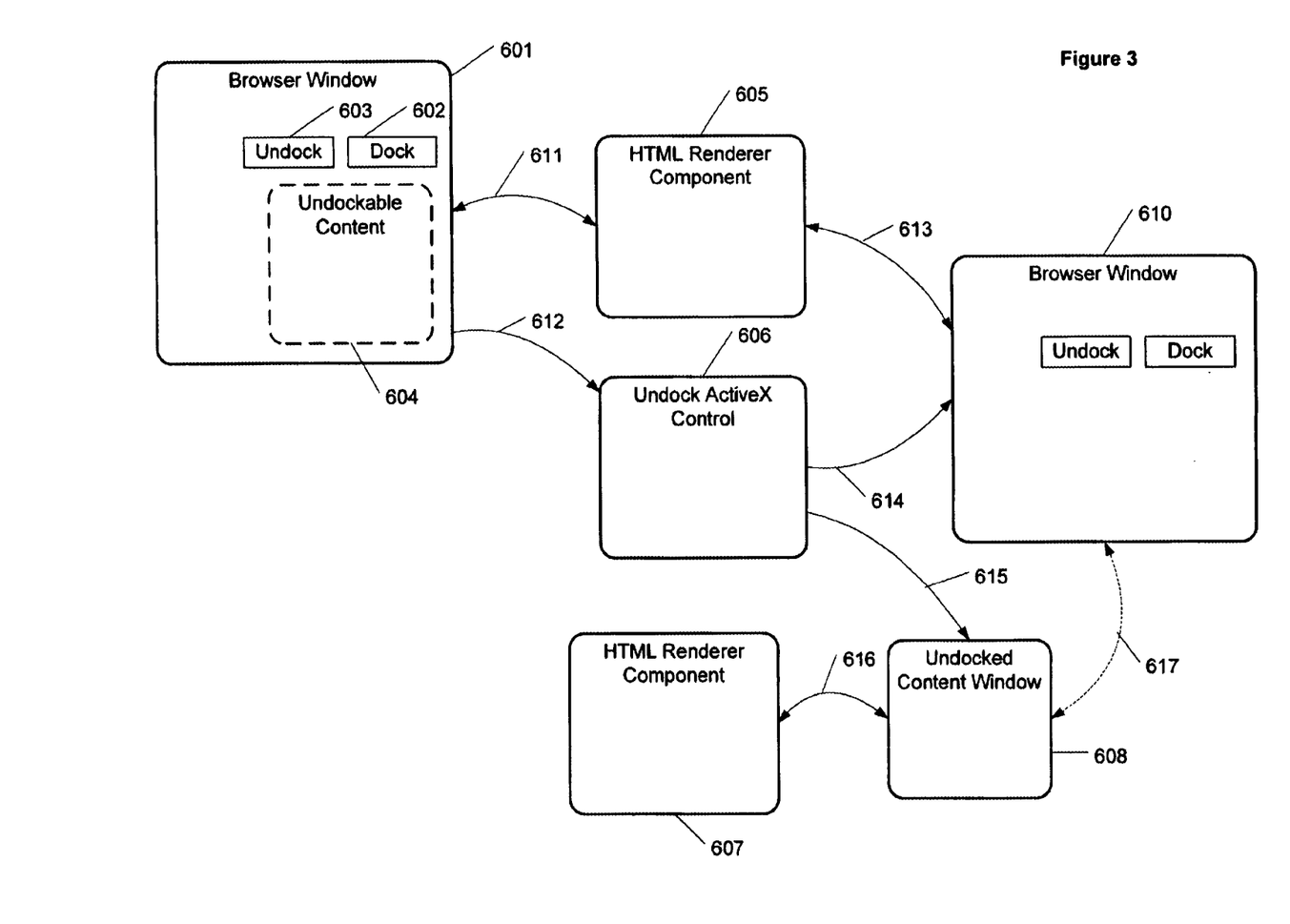
FIG. 3 shows a control object creation flow diagram according to embodiments of the present invention.

FIG. 3 shows a flow diagram of the undocking of a content window. Browser window 601 includes undock button 603 and dock button 602. Undockable content window 604 is shown in a dotted line to represent that the undockable content may appear part of the general content displayed in browser window 601. While described in reference to ActiveX®, it is also appreciated that the invention may be practiced in Java or in any programming language that may control the formation and creation of windows.

Alternatively, the undockable content window 604 may be otherwise identified as undockable. For example, window 604 may be shaded differently than the rest of window 601, the type face of the font used may be different, the size of the font may be different, and a border may exist around the window 604. It is noted that these are only a few examples of the many alternative ways of representing the window 604 to a user. Variations thereof are considered within the scope of the invention described herein.

Browser window 601 relies on an HTML renderer component 605 to determine how to display received HTML content.

In one example, this renderer 605 is instantiated when browser window 601 is opened. When new information arrives at browser window 601, the browser window 601 determines how to display the new HTML content (or related displayable content or data including images) as represented by the information exchange 611. Alternatively, the renderer 605 may be part of a browser application 601. Here, there may be no clear distinction between the renderer and the browser.

When a user instructs the underlying computer system (for example, a local computer, a network computer, and those as know in the art) to undock undockable content window 604 from browser window 601, an event is sent 612 (or "fired" as is know in the art) to an Undock ActiveX® control 606. The Undock ActiveX® control then separates browser window 601 and undockable content window 604 into two windows (the browser window 610 and the undocked content window 608) through actions 614 and 615, respectively. Once undocked, the name or identity of the undocked content window 608 may be specified automatically.

In another embodiment, the undockable content window 604 remains in browser window 610 and an instance of undockable content window 604 is instantiated as undocked content window 608. Recursively performing this operation results in multiple child windows from browser window 610. The names of the various child windows are named by the naming function described above.

Browser window 610 remains connected to the instance 605 of the HTML renderer component as shown by path 613. A new instance of the HTML render component is instantiated as HTML render component 607 to support the undocked window 608 as shown via path 616. Alternatively, the HTML renderer 607 may not be instantiated and undocked content window 608 may be supported by the HTML renderer 605.

When undocked, undocked content window 608 remains in contact with browser window 610 at least to its current content as shown via path 617. To this end, the undocked content window may fire and receive events from browser window 610 for related events. For example, if browser window 601 included a home financing script or program with the result displayed in undockable content window 604, when undocked, the undocked content window 608 would still be able to receive updated calculations from the calculating script behind the displayed browser window 610 (post-undocking).

In an alternative embodiment, the undocked content window 608 may be severed from the parent browser window 610 once undocked. In this case, updates in parent browser window 610 would not be conveyed to the undocked window 608. One advantage of not linking the undocked content window 608 to browser window 610 is that, when multiple copies of the undocked content window 608 are made, each copy may be distinct. This allows a comparison between the different child windows 608. For example, in the calculation example given above, an end user may wish to perform the calculations using various criteria. Instead of printing out multiple copies of the results from the calculations, the end user may undock the results of the calculation every time a new calculation is made. Thus, the results of the calculations may be compared on-screen without printing out each new result.

When browser window 610 is navigated to another location, the new location may not include a separable content window. In this regard, the undocked window retains the same state despite browser window 610 navigating away. If the browser is navigated back to the original location that eventually resulted in the creation of undocked content window 608, four alternatives may occur. These four alternatives are dependent on the script creating the undocked content window. First, the undocked content window 608 may be updated with the content from the re-navigated to location by browser window 610. Second, the undocked content window 608 may retain its current state and not be updated by the new state of the re-navigated to location. Third, the undocked content window 608 may be re-incorporated (docked) into browser window 610 and the new content of the re-navigated to location replace the content of undocked content window 608. Finally, fourth, the undocked content window 608 may be re-incorporated (docked) into browser window 610 and the content of the undocked content window 608 replace the content of the re-navigated to location as displayed in browser 610. Each of these four variations has its advantages as determined by the content on the navigated to page.

E. Objects and Object Relationships

Figure 4:
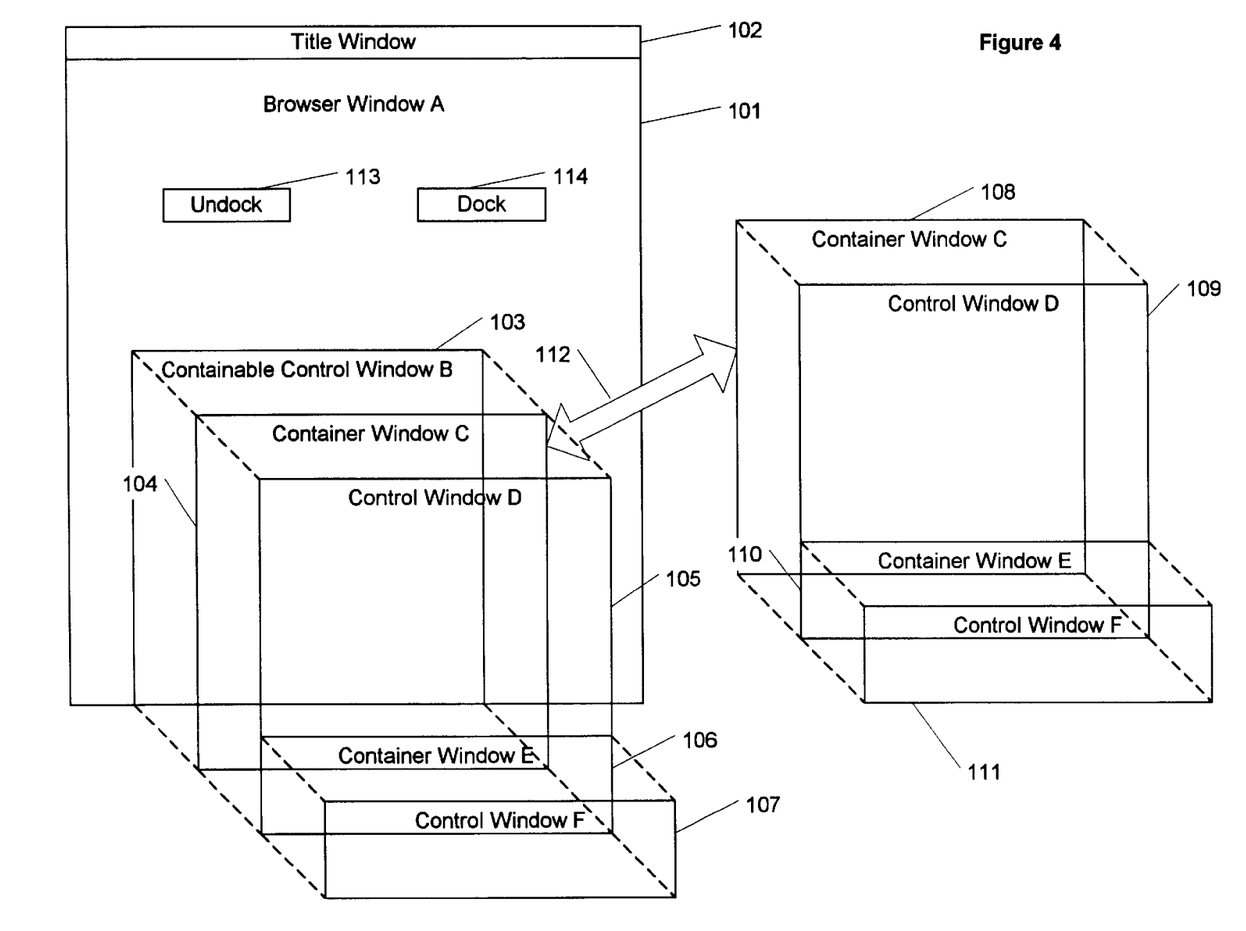
FIG. 4 shows nesting container and control windows according to embodiments of the present invention.
Figure 5:
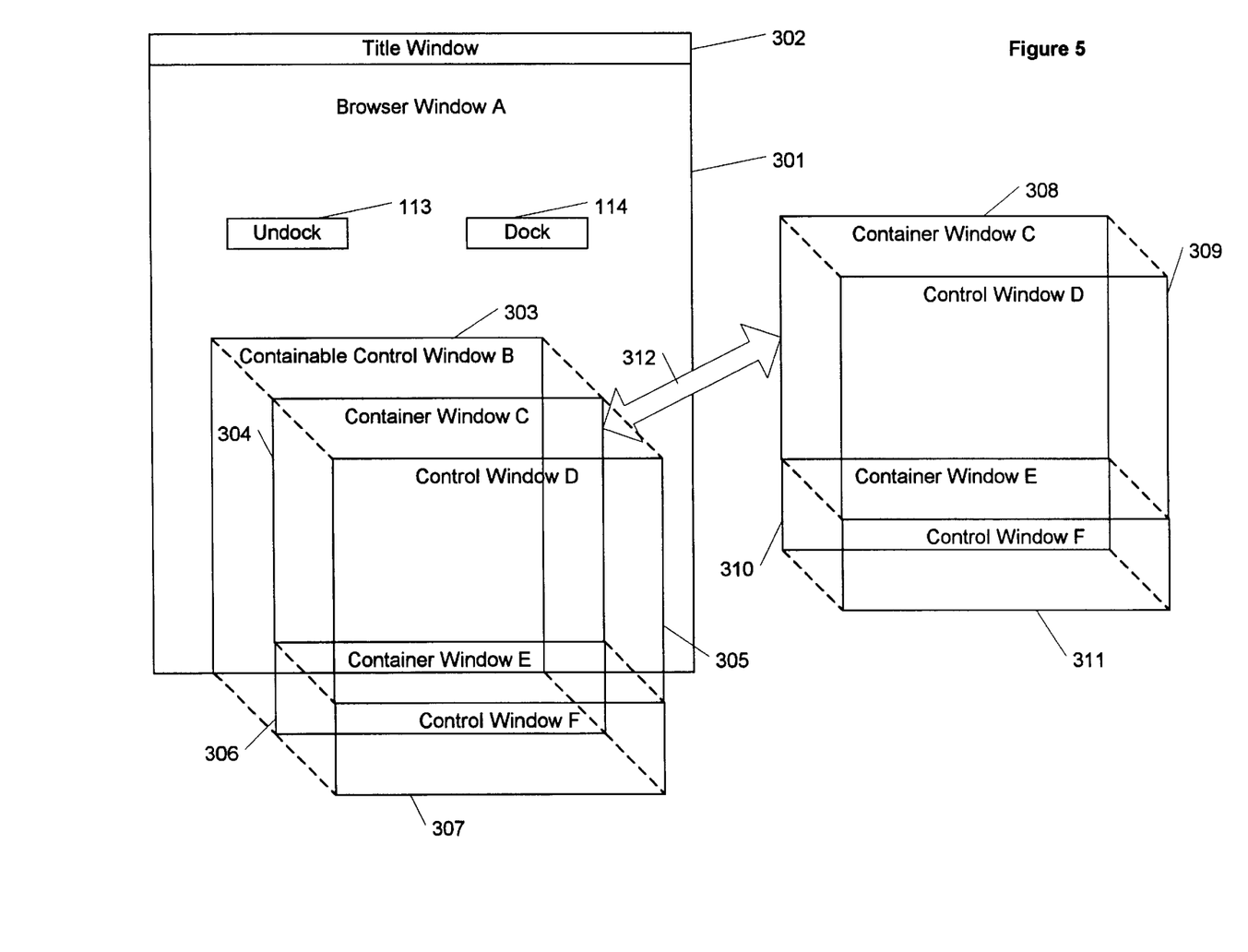
FIG. 5 shows parallel container and control windows according to embodiments of the present invention; and, FIGS. 6A and 6B show control object relationships according to embodiments of the present invention.

Objects are used to create and control the windows described above. FIGS. 4 and 5 show various windows and the supporting objects. FIG. 4 shows browser window A 101 with title window 102. As described above, an undock button 113 and a dock button 114 are displayed in browser window A 101. Alternatively, the functions of these buttons may be incorporated into mouse commands or keystrokes. A number of objects are contained in browser window A. First is containable control window B 103. Within containable control window B 103 is container C 104. Within container C 104 is control window D 105. Control window D is what an end user sees when navigating to the page. When the end user initiates a command (for example through clicking on undock button 113) to undock the control window D 105, both container window C and control window D are undocked as shown by arrow 112. Arrow 112 is bi-directional indicating that a window may be docked and undocked. Here, control window D exists as contained in container window C. The undocked versions of container window C and control window D are represented by windows 108 and 109, respectively. In one embodiment, once container window C 104 and control window D 105 are undocked from browser window A 101, containable control window B 103 may remain on the page displayed in browser window A as a place holder.

Multiple undockable windows may be included on a page. When separate from each other, the undockable windows have distinct containable control windows B 103. When combined, a single containable control window B 103 may support multiple container windows C. At least two variations on how the container windows are supported exist. First, as shown in FIG. 4, the container windows are nested in higher-level container windows. Here, container window E 106 (supporting control window F 107) is nested into container window C 104. When undocked, container window C 108 includes control window 109 and container window E 110 (which includes control window F 111). While not shown in FIG. 4, container window E 110 may be undocked from container window C 108. Container window C 108 resizes to hold control window D 109.

FIG. 5 shows an alternative scheme for supporting container and control windows. FIG. 5 shows containable control window B 303 having container window C 304 (containing control window D 305) and container window E 306 (containing control window F 307). In FIG. 5, containable control window B 308 stores both container window C 304 and container window E 306 at the same level. Similar to FIG. 4 described above, undock/dock arrow 312 is shown. After undocking, container window C 308 includes control window D 309. Juxtaposed to container window C 308 is container window E 310 (containing control window F 311).

The invention may be practiced by adding additional script callable methods to the IFRAME object that is present in the Internet Explorer 4.0 "Document Object Model". The additional methods may allow the contents of the IFRAME to be undocked or docked, the creation of additional instances of sub document objects, and the ability to route events to or from the parent document and the IFRAME sub document. Also, the invention may be practiced through the use of script including Java, ActiveX® controls, and other known scripting languages. While the following relates to the implementation of the invention in an ActiveX® control, implementations in other languages as described above is considered to be within the scope of the present invention.

An ActiveX® control allows script in an HTML document to create sub-windows that can be docked or undocked by script control and, thus, by user control. As sub-windows can host any ActiveX® control, they can also independently host the HTML renderer control (also referred to as the WebBrowser ActiveX® control. Using this technique, the sub-windows can render received HTML documents.

To use a control, it needs to be instantiated. An example HTML tag section to instantiate the control is as follows:

```
<OBJECT ID="DockCtl" height=90 width=300
   CLASSID="CLSID:3fb6ccc7-2af2-11d2-bc63-
      00aa00a13c86">
</OBJECT>
```

This also is used to identify where the "docked" location and what its size is in a main HTML document. Once instantiated, the control will create a child window of the browser application's window.

Next, script in the HTML document may prompt the control to create a sub-window. A sample statement is as follows:

```
<script language=javascript>
mysub=DockCtl.HostControl("{8856F961-340A-11D0-
   A96B-00C04FD705A2}",
   "Caption", "Name", true);
</script>
```

Here, the control is identified as "DockCtl". This control is asked to create a sub-window (containable control window) and host the control identified. It also specifies that the sub-window (containable control window) should have a caption of "Caption" and a name of "Name". Further, it specifies that a new sub-window (container window) should be created and immediately docked in the control's first sub-window (containable control window). In response, the control creates the container window inside the containable control window. Finally, the system instantiates the identified control and initializes it by telling it to draw a control window inside of the newly created container window. Once the control window is created and the identified control is instantiated, an object pointer is returned to the script. This object pointer allows one to reference the instantiated control. In the following lines of script, the object pointer is named "mysub". Now script can call methods implemented by the hosted control such as Navigate in the case of the WebBrowser control with:

mysub.Ctl.Navigate("http://test.htm");

This will cause the WebBrowser control (HTML renderer control) to render the specified document inside of the newly created child window. Now the main HTML document can present a user interface (e.g., a button described above) to allow the user to undock the child window. The script action that results from the user indicating that it wants the window to be undocked needs to tell the sub-window object to undock. An example code is as follows:

mysub.Undock( )

In a Windows 32 implementation of the invention, a container window C 104 in FIG. 4 is undocked by calling, for example, USER API's to switch the container window from being a child window to being a top-level window. The container window can also be re-docked by switching the window back to being a child window of the containable control window B 103.

Through using the nesting scheme described in FIG. 4, a number of advantages are provided. First, the control can create any number of sub-windows; with only one being docked at a time. This may be used for implementing individual instances of tear-off data such as notes or calculation results, etc. as described above. Also, the control may maintain a list of created sub-windows that can be searched by the Name specified in a HostControl list of sub-windows. This allows script in an HTML document to find the object pointer to an earlier created sub-window. This would be useful, if the HTML document only wants one version of a sub-window to exist; if the user undocks a sub-window and then navigates the browser away from the main document and later returns to the same main document, then script in the document could find the original undocked sub-window and force it to dock again, or leave it undocked without creating another sub-window.

Figure 6A:
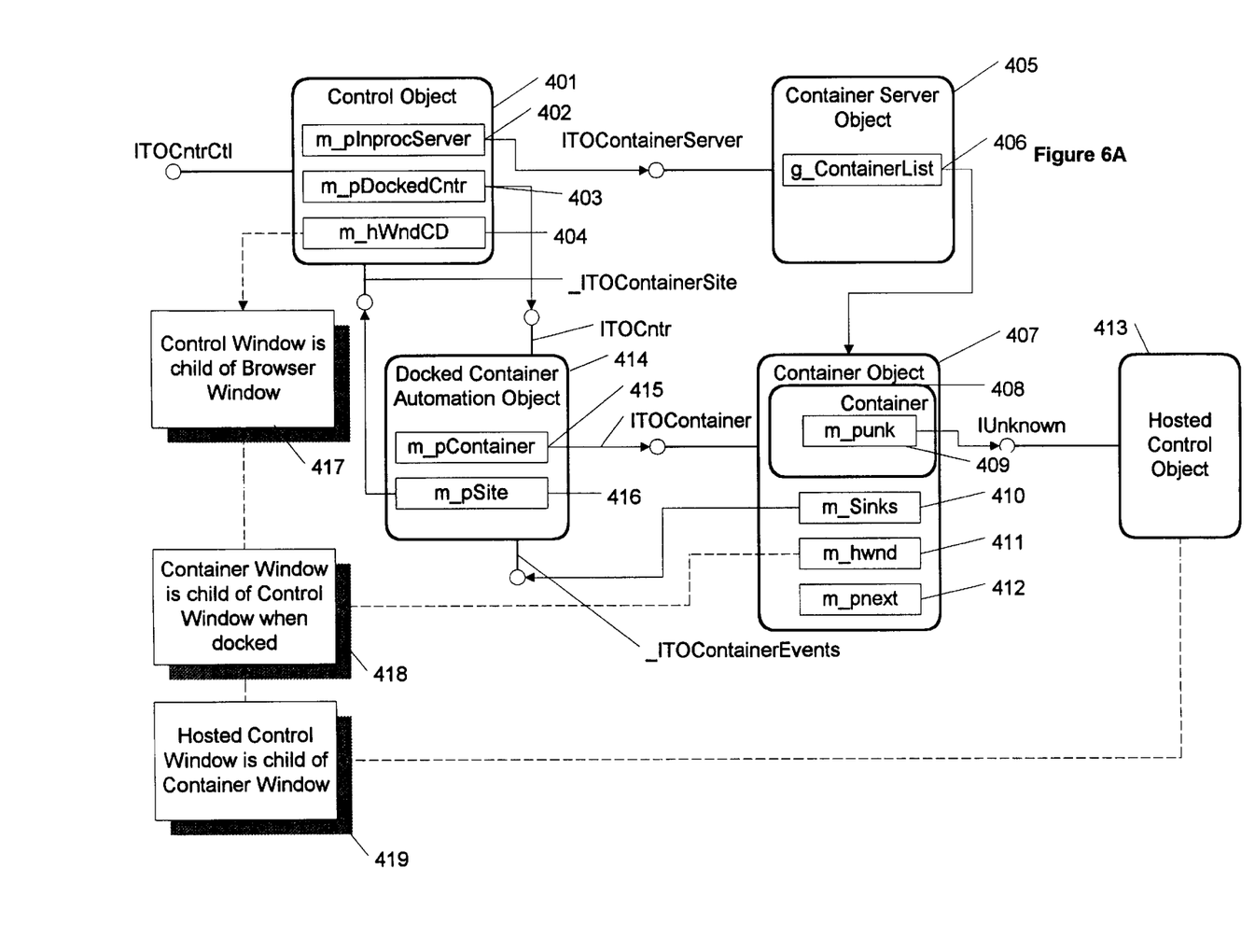
Figure 6B:
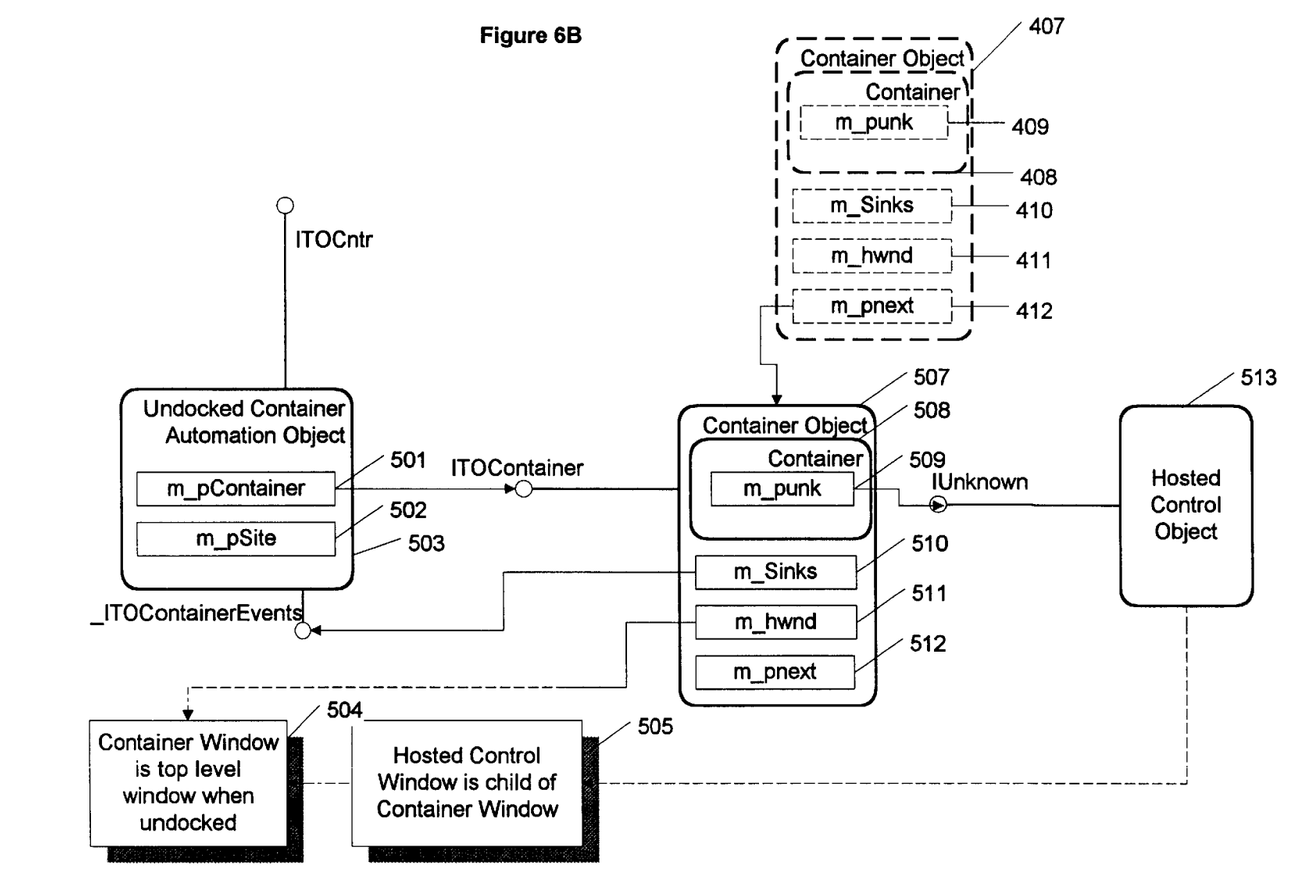

FIGS. 6A and 6B show the objects used in an ActiveX control as an implementation of this invention. Control object 401 is the main object for the ActiveX control; it provides an interface that is script callable (ITOCntrCtl), which allows containers to be created and located by name. The control object 401 include the following members: m_pInprocServer 402 (which holds a reference to the container server object 405), m_pDockedCntr 403 (which holds a reference to a container automation object 414, if one is docked), and m_hWndCD 404 (a handle to its containable control window 417, or B 103 in FIG. 4). The container server object 405 is responsible for creating and maintaining a list of created container objects. It provides an interface for the control object 401 to create and locate container objects (ITOContainerServer). Container server object 405, 505 maintains a list of created container objects 407, 507 in g_ContainerList 406 (FIG. 6A). Each container object 407, 507 includes three members: m_sinks 410, 510 (which hold references to the container automation object 414, so that event notifications can be sent to the container automation object 414 shown in FIG. 6A), m_hwnd 411 (a handle to its container window 418, or C 104 in FIG. 4), and m_pnext 412, 512 (which points to the next container object 407 listed in list g_ContainerList 406 shown in FIG. 6A). Each container object 407, 507 also contains a container 408, 508 that is the host for a hosted control, so its member m_punk 409, 509 holds a reference to the hosted control object 413, 513. The hosted control object 413 owns a control window 419, or D 105 in FIG. 4, which is a child window of the container window 418. For each container object 407 exists a container automation object 414; it provides the script callable interface (ITOCntr) which allows containers to be docked, to be undocked, to be closed, and to fire events. The member m_pContainer 415 holds a reference to the container object 407, and, for the most part, it wraps the non-script callable interface (ITOContainer) with it script callable one (ITOCntr). It also has a member m_pSite that holds a reference back to the control object 401, if the container is currently docked.

When docked, container window 418, which is the container window related to container 408, is considered a child window of the control window 417. When undocked, the container window is considered not a child window of the control window.

As shown in FIG. 6A, container window 418 is in the docked state, so m_pDockedCntr 403 holds a reference to the container automation object 414, m_pSite 416 holds a reference to the control object 401, m_pDockedCntr 403 holds a reference to 414, and container window 418 is a child window of the control window 417. FIG. 6B shows a container window 504 in the undocked state. Here, there is no reference to the container automation object 503 from the control object 401, m_pSite 502 does not hold a reference to the control object 401, and container window 504 is considered a top-level window.

Figure 7:
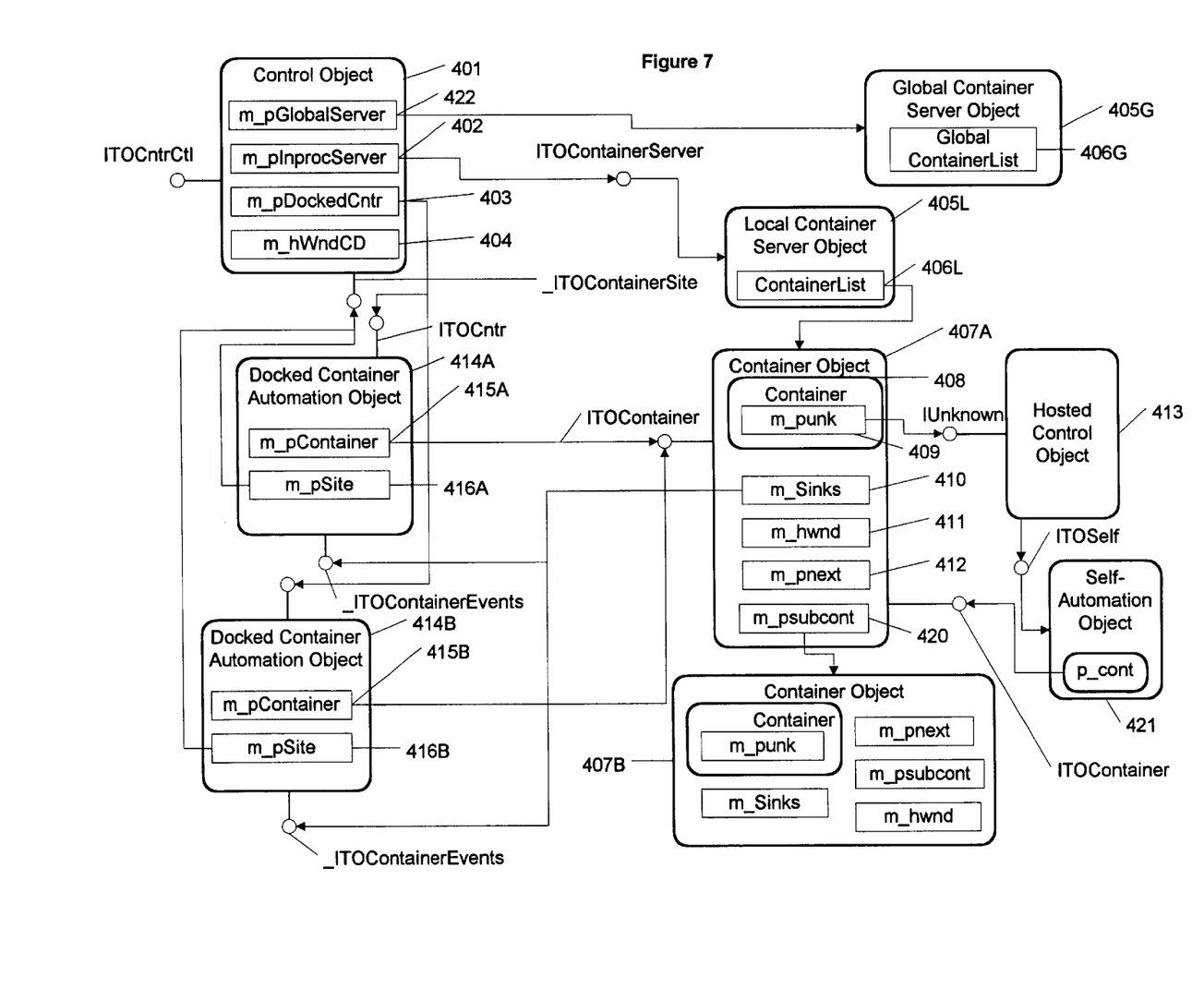
FIG. 7 shows control object relationships according to additional embodiments of the present invention.

FIG. 7 reflects alternative embodiments of the present invention. For example, FIG. 7 includes a global container server object 405G. This server object contains a global container list 406G that includes a list of the container objects and to which local container server object (for example, 405L) is related. Control object 401 may include m_pGlobalServer 422 that holds a reference to the global container server object 405G. Here, control object 401 may hold references to both an in-process server and an out-of-process server. Each local container server object (for example, 405L) contains a list (ContainerList 406L, for example) of containers created and supported by the local server object 405L and as further described with reference to FIG. 6A above.

One automation object may exist for every container object. For example, if one wants to display a stock ticker in an application, the container object would contain the information to be displayed and the container automation object would contain the settings on how to display the subject information. In some cases, it may be desirable to display the stock ticker in two separate applications (for example, in two separate browser windows). As the information to be displayed for the two applications is the same, one container object may be used. As the display settings may be different, two automation objects may be used. For instance, if one instance of the information is to be displayed at a fast rate and the other at a slow rate, two container automation objects 414A and 414B may be used. The two container automation objects 414A and 414B include member m__pContainer, 415A, 415B and member m__pSite 416A, 416A, respectively. FIG. 7 shows the two container objects both in a docked state pointing to container object 407A. In other circumstances, for example, when the information to be displayed in the two applications is different, a separate container object may be use for each application. It is understood that additional information contents may be used including images, databases, sounds, active or interactive sub application, etc.

In FIG. 6A, each container object pointed to the next container object in the list g__ContainerList 406 through pointer m__pnext 412. In FIG. 7, each container object 407A also points to a nested container object (for example the object supporting container window E 106 as nested in container window C 104 of FIG. 4) using m__psubcont 420.

To implement the parallel containers as shown in FIG. 5, a similar pointer may be used that represents that the next container object is a parallel depth window, not a nested window. Here, this pointer is not shown for simplicity.

Further, in some instances, a hosted control object 413 may not always point back to the object or container that referenced it. For example, the hosted control object 413 may require script to determine a self-automation object 421 exists to allow a hosted control to determine information about itself. For instance, the hosted control object may be an application (a browser) in which the application requires additional information on how to function (what methods it can implement, etc.). The self-automation object 421 implements interface ITOSelf that allows script hosted by hosted control object 413 to control container 407A. To complete the A information flow path between hosted control object 413, self-automation object 421, and container object 407A, self-automation object 421 may also include a reference p__cont back to container object 407A through interface ITOContainer.

As discussed above, another implementation of the invention is to add an extension of script callable methods to the IFRAME object, which provides control over an IFRAME element of HTML. While not described in detail, this alternative implementation is considered within the scope of invention and realizable by one of ordinary skill in the art based on the above disclosure.

The above-described invention may be applied to various applications. The invention may be used to create a new application inside of another application. Here, the new application would operate within the original application yet be separable from it when desired. Also, a collection of sub-applications may be combined to form a general application, for example a general desktop application including user interfaces for email, a data base program, a word processor program, a spreadsheet program, a notebook, and the like. In each application, the various components may be separable from each other as each is represented as an undockable object. For example, a user may create a tool bar containing a variety of user-specific applications. The toolbar may have relevance to a number of different applications. By using the above invention, the toolbar may be instantiated in conjunction with one application, undocked from the first application (which is then closed), then docked to a new application, here preserving any changes made to the toolbar when originally instantiated by the first application.

Further, the invention allows for greater customization of the desktop user interface as various display information may be provided in an undockable form. For example, a disk defragmentor application would include a separable status bar, which may be placed on a desktop apart from the more inclusive general defragmentor user interface.

F. Summary

A docking/undocking invention has been disclosed. The docking and undocking techniques allow a developer to encapsulate content in undockable and dockable elements (including scripts, controls, or related delimiters as an extension to the IFRAME of HTML). Further, it will be apparent to those skilled in the art that application of the present invention is not restricted to HTML as found on the Internet. It is also envisioned that the techniques of the present invention apply to any network using HTTP, including HTTPS-compliant networks, intranets and extranets. It is further envisioned that the techniques of the present invention apply in any text-authoring context where complex scripts require detailed knowledge of databases as well as related pages. For example, embodiments of the present invention contemplate the use of the disclosed undocking/docking system in conjunction with other systems including spreadsheets and other related environments.

Further, the present invention may also be implemented in a peer-to-peer computing environment or in a multi-user host system with a mainframe or a minicomputer, allowing the porting of data from one application to another. Thus, the computer network, in which the invention is implemented, should be broadly construed to include any client/server computer network from which a client can retrieve a remote document on a server (even if that document is available on the same machine or system).

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

We claim:

1. A method for undocking content from a window in an application said window displaying a document in HTML, comprising:

displaying said document in said window, said document being associated with a host address location and said document including at least an HTML delimiter designating undockable content therein;

receiving a user input indicating that said undockable content is to be undocked from said window;

undocking said undockable content of said document from said window into a sub-window so as to display said undockable content for independent movement and manipulation from said window; and altering said window;

wherein said application is a web browser and said altering step includes navigating said web browser to a new host address location including additional undockable content different from said undockable content: further including a step of docking said sub-window back into said window of said web browser upon receiving user input; wherein upon docking said sub-window, said undockable content of said sub-window is updated to reflect any changes in the undockable content of said window.

2. The method according to claim 1, wherein said undockable content is selected from a group comprising a computer readable image or a computer readable text character.

3. The method according to claim 1, wherein said displaying step includes displaying a graphical object associated with said undockable content.

4. The method according to claim 1, wherein said step of docking said sub-window back into said window of said web browser includes a step of displaying said sub-window.

5. A method for undocking content from a window in an application, said window displaying a document in HTML, comprising:

displaying said document in said window, said document being associated with a host address location and said document including at least an HTML delimiter designating undockable content therein;

receiving a user input indicating that said undockable content is to be undocked from said window;

undocking said undockable content of said document from said window into a sub-window so as to display said undockable content for independent movement and manipulation from said window; and altering said window;

wherein said application is a web browser and said altering step includes navigating said web browser to a new host address location including additional undockable content different from said undockable content further including a step of docking said sub-window back into said window of said web browser upon receiving user input; wherein upon docking said sub-window, said undockable content of said sub-window replaces any changes in content of said window.

6. The method according to claim 5, wherein said undockable content is selected from a group comprising a computer readable image or a computer readable text character.

7. The method according to claim 5, wherein said displaying step includes displaying a graphical object associated with said undockable content.

8. The method according to claim 5, wherein said step of docking said sub-window back into said window of said web browser includes a step of displaying said sub-window.

9. A user interface for undocking content from a window including:

a first display portion representing said window of an open application, said window containing a first content section;

a second display portion comprising a sub-window containing said first content section, said second display portion being displayed in response to a user input requesting separation of said first content section from said window; wherein said second display portion retains said content after said application has been closed wherein said second display portion is separated from said first display portion after a predetermined period of elapsed time.

10. The user interface according to claim 9, wherein said first content section is selected from a group comprising a computer readable image or a computer readable text character.

11. The user interface according to claim 9, wherein said open application comprises a browser application.

12. The user interface according to claim 9, wherein said first content section includes computer readable data from an application different from said open application.

13. The user interface according to claim 9, wherein said first content section includes computer readable data from a host address on a computer network.

14. A computer readable medium having computer executable instructions thereon for a method of undocking content from a window in an application, said window displaying a document in HTML, the method comprising:

displaying said document in said window, said document being associated with a host address location and said document including at least an HTML delimiter designating undockable content therein;

receiving a user input indicating that said undockable content is to be undocked from said window;

undocking said undockable content of said document from said window into a sub-window so as to display said undockable content for independent movement and manipulation from said window; and altering said window;

wherein said application is a web browser and said altering step includes navigating said web browser to a new host address location including additional undockable content different from said undockable content; further including a step of docking said sub-window back into said window of said web browser upon receiving user input; wherein upon docking said sub-window, said undockable content of said sub-window is updated to reflect any changes in the undockable content of said window.

15. The computer readable medium according to claim 14, wherein said undockable content is selected from a group comprising a computer readable image or a computer readable text character.

16. The computer readable medium according to claim 14, wherein said displaying step includes displaying a graphical object associated with said undockable content.

17. The computer readable medium according to claim 14, wherein said step of docking said sub-window back into said window of said web browser includes a step of displaying said sub-window.

18. A computer readable medium having computer executable instructions thereon for a method for undocking content from a window in an application, said window displaying a document in HTML, comprising:

displaying said document in said window, said document being associated with a host address location and said document including at least an HTML delimiter designating undockable content therein;

receiving a user input indicating that said undockable content is to be undocked from said window;

undocking said undockable content of said document from said window into a sub-window so as to display said undockable content for independent movement and manipulation from said window; and altering said window;

wherein said application is a web browser and said altering step includes navigating said web browser to a new host address location including additional undockable content different from said undockable content; further including a step of docking said sub-window back into said window of said web browser upon receiving user input; wherein upon docking said sub-window, said undockable content of said sub-window replaces any changes in content of said window.

19. The computer readable medium according to claim 18, wherein said undockable content is selected from a group comprising a computer readable image or a computer readable text character.

20. The computer readable medium according to claim 18, wherein said displaying step includes displaying a graphical object associated with said undockable content.

* * * * *